(12) United States Patent
Muench-Casanova et al.

(10) Patent No.: US 9,910,660 B2
(45) Date of Patent: Mar. 6, 2018

(54) OPERATING SYSTEM REPLACEMENT FOR IN-VEHICLE COMPUTING SYSTEM

(71) Applicant: Harman International Industries, Incorporated, Stamford, CT (US)

(72) Inventors: Stephen Muench-Casanova, Rochester Hills, MI (US); Paul Beets, Indianapolis, IN (US); Brian Bolinger, Columbia City, IN (US); Alexander Klochko, Kiev (UA); Steven Edward Montealegre, Mary Esther, MI (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 14/451,296

(22) Filed: Aug. 4, 2014

(65) Prior Publication Data

US 2015/0040113 A1    Feb. 5, 2015

Related U.S. Application Data

(60) Provisional application No. 61/862,454, filed on Aug. 5, 2013.

(51) Int. Cl.
*G06F 9/445* (2018.01)
*G06F 9/44* (2018.01)

(52) U.S. Cl.
CPC .............. *G06F 8/65* (2013.01); *G06F 9/4406* (2013.01)

(58) Field of Classification Search
CPC .................................. G06F 8/65; G06F 9/4406
USPC ................... 717/168, 171, 172, 173
See application file for complete search history.

(56) References Cited

U.S. PATENT DOCUMENTS

| | | | | |
|---|---|---|---|---|
| 4,750,150 | A * | 6/1988 | Weppler | G05B 19/054 710/8 |
| 5,579,520 | A * | 11/1996 | Bennett | G06F 8/443 717/130 |
| 5,870,537 | A * | 2/1999 | Kern | G06F 11/2064 711/162 |
| 6,067,500 | A * | 5/2000 | Morimoto | G06F 8/65 340/988 |
| 6,615,404 | B1 * | 9/2003 | Garfunkel | G06F 8/665 717/173 |
| 7,380,113 | B2 * | 5/2008 | Ebsen | G06F 8/67 713/1 |

(Continued)

OTHER PUBLICATIONS

How Computers Boot up—Gustavo Duarte—2008 Located at http://duartes.org/gustavo/blog/post/how-computers-boot-up/.*

(Continued)

*Primary Examiner* — Hossain Morshed
(74) *Attorney, Agent, or Firm* — McCoy Russell LLP

(57) ABSTRACT

Embodiments are disclosed for a method of replacing an original operating system with a new operating system. In one example embodiment, a method to selectively replace a first in-vehicle operating system includes receiving a temporary update including a second in-vehicle operating system for storage in a memory location of the first in-vehicle operating system and receiving a request to update the first in-vehicle operating system based on the temporary update. The method may further include triggering a reboot of the first in-vehicle operating system including installing the second in-vehicle operating system.

20 Claims, 8 Drawing Sheets

(56) References Cited

U.S. PATENT DOCUMENTS

| | | | |
|---|---|---|---|
| 8,214,653 B1* | 7/2012 | Marr | G06F 21/572 380/286 |
| 8,935,688 B2* | 1/2015 | Cornwell | G06F 8/665 717/168 |
| 2002/0069354 A1* | 6/2002 | Fallon | G06F 3/0613 713/2 |
| 2003/0131083 A1* | 7/2003 | Inui | G06F 8/65 709/221 |
| 2004/0117610 A1* | 6/2004 | Hensley | G06F 9/4406 713/2 |
| 2004/0153724 A1* | 8/2004 | Nicholson | G06F 11/0709 714/6.11 |
| 2004/0162955 A1* | 8/2004 | Jones | G06F 8/67 711/162 |
| 2005/0138645 A1* | 6/2005 | Lu | G06F 11/1433 719/321 |
| 2005/0197747 A1* | 9/2005 | Rappaport | H04L 67/12 701/1 |
| 2006/0080579 A1* | 4/2006 | Rothman | G06F 11/3664 714/43 |
| 2007/0226795 A1* | 9/2007 | Conti | G06F 21/554 726/22 |
| 2008/0005611 A1* | 1/2008 | Solyanik | G06F 11/1464 714/6.12 |
| 2008/0005733 A1* | 1/2008 | Ramachandran | G06F 8/65 717/168 |
| 2009/0083727 A1* | 3/2009 | Fu | G06F 21/57 717/172 |
| 2009/0259612 A1* | 10/2009 | Hanson | H04L 69/22 706/47 |
| 2010/0241838 A1* | 9/2010 | Cohen | G06F 11/1004 713/2 |
| 2010/0306754 A1* | 12/2010 | Javed | G06F 9/44521 717/152 |
| 2011/0022545 A1* | 1/2011 | Durney | G06Q 50/04 705/500 |
| 2011/0166824 A1* | 7/2011 | Haisty | G01B 5/12 702/157 |
| 2011/0167250 A1* | 7/2011 | Dicks | A61B 5/1112 713/2 |
| 2012/0005467 A1* | 1/2012 | Butler | G06F 9/4416 713/2 |
| 2012/0117607 A1* | 5/2012 | Li | H04N 21/23617 725/132 |
| 2012/0131473 A1* | 5/2012 | Biron, III | G06F 9/45512 715/744 |
| 2012/0143402 A1* | 6/2012 | Kim | H04Q 9/00 701/2 |
| 2013/0033448 A1* | 2/2013 | Yano | G06F 3/04883 345/173 |
| 2013/0060558 A1* | 3/2013 | Schultz | G06F 9/45504 703/23 |
| 2013/0145141 A1* | 6/2013 | Han | G06F 8/65 713/2 |
| 2013/0151646 A1* | 6/2013 | Chidambaram | H04L 47/6205 709/213 |
| 2013/0185563 A1* | 7/2013 | Djabarov | G06F 9/44 713/176 |
| 2013/0283256 A1* | 10/2013 | Proud | H01F 38/14 717/172 |
| 2014/0075169 A1* | 3/2014 | Andrews | G06F 9/4416 713/2 |
| 2014/0088793 A1* | 3/2014 | Morgan | B60R 16/037 701/2 |
| 2014/0109076 A1* | 4/2014 | Boone | G06F 8/65 717/170 |
| 2014/0195663 A1* | 7/2014 | Hirschenberger | H04W 4/003 709/223 |
| 2014/0277735 A1* | 9/2014 | Breazeal | B25J 11/0005 700/259 |
| 2014/0372999 A1* | 12/2014 | Becker | G06F 8/665 717/169 |
| 2015/0040113 A1* | 2/2015 | Muench-Casanova | G06F 8/65 717/168 |
| 2015/0254072 A1* | 9/2015 | Wojcik | G06F 8/71 710/13 |
| 2015/0314454 A1* | 11/2015 | Breazeal | B25J 9/0003 700/259 |

OTHER PUBLICATIONS

Boot Sector—MS Tech Net—2016 Located at https://technet.microsoft.com/en-us/library/cc976796.aspx.*

NPL-Duarte-2008, Author: Duarte, Title: "How computers Boot up", located at http://duartes.org/gustavo/blog/post/how-computers-boot-up/.*

Red Bend, "Updating Car ECUs Over-The-Air (FOTA)", Red Bend Software, White Paper 2011, located at http://www.redbend.com/data/upl/whitepapers/red_bend_update_car_ecu.pdf.*

* cited by examiner

OPERATING SYSTEM REPLACEMENT FOR IN-VEHICLE COMPUTING SYSTEM

CROSS-REFERENCE TO RELATED APPLICATION

The present application claims priority to U.S. Provisional Application No. 61/862,454 filed on Aug. 5, 2013, which is hereby incorporated by reference in its entirety for all purposes.

FIELD

The present disclosure relates to in-vehicle computing systems and the replacement of operating system software on such computing systems.

BACKGROUND

A user may interact with one or more systems in a vehicle via an in-vehicle computing system. The in-vehicle computing system may interface with a speaker system of the vehicle to play media content, conduct phone calls for the user, and provide information to the user, among other features. For example, the in-vehicle computing system may provide information regarding weather, traffic, driving directions, vehicle diagnostics, and the like. The in-vehicle computing system may include an embedded computing system that provides a more restrictive interface compared to personal computers, such as computers using desktop operating systems, and may be more difficult to configure or alter than a personal computer. Alteration of the in-vehicle computing system may also disrupt other vehicle systems and a user experience while the user is in the vehicle and the vehicle is operating.

SUMMARY

Embodiments are disclosed for a method of replacing original operating system software with a new operating system. In one example embodiment, a method to selectively replace a first in-vehicle operating system includes receiving a temporary update including a second in-vehicle operating system for storage in a memory location of the first in-vehicle operating system and receiving a request to update the first in-vehicle operating system based on the temporary update. The method may further include triggering a reboot of the first in-vehicle operating system including installing the second in-vehicle operating system.

In another embodiment, a method of replacing an original operating system with a new operating system for an in-vehicle computing system may include receiving an image file system (IFS) and initial program loader (IPL) files at an external storage device interface of the in-vehicle computing system during operation of the in-vehicle computing system under the original operating system. The method may further include storing the IFS and the IPL files in a first memory location of the in-vehicle computing system, rebooting the in-vehicle computing system while operating under the original operating system, and moving the IFS and the IPL files from the first memory location to a second memory location that is specified by the processor to be the place from where the system will reboot. The first memory location may be a temporary memory location. After moving the IFS and IPL files to the second memory location, the method may include rebooting the in-vehicle computing system while operating under the original operating system and automatically restarting the in-vehicle computing system under the new operating system.

In another embodiment, a method of replacing an original operating system with a new operating system in an in-vehicle computing system may include installing an application for installing the new operating system file within the original operating system, writing an image file system (IFS) and initial program loader (IPL) files to a temporary memory location, performing a first reboot of the in-vehicle computing system while operating under the original operating system, and automatically running the application to rewrite (or move) the IFS and the IPL files from the first memory location to a second memory location. The method may further include performing a second reboot of the in-vehicle computing system while operating under the original operating system, and automatically restarting the in-vehicle computing system under the new operating system at a specified restarting location in memory.

An example in-vehicle computing system for performing one or more of the disclosed methods may include an audio device interface for communicating with one or more audio devices of a vehicle, a storage device, an external device interface, a memory device configured to store instructions, and a processor. The processor may be configured to execute the instructions to receive an image file system (IFS) and initial program loader (IPL) files at the external storage device interface during operation of the in-vehicle computing system under an original operating system, install an application for saving a new operating system file within the original operating system, and reboot the in-vehicle computing system while operating under the original operating system. The processor may further be configured to execute the instructions to run the application to rewrite the IFS and the IPL files from a first memory location to a second memory location, reboot the in-vehicle computing system while operating under the original operating system, and automatically restart the in-vehicle computing system under the new operating system. The original operating system may or may not be deleted from the system's memory upon installation of the new operating system.

BRIEF DESCRIPTION OF THE DRAWINGS

The disclosure may be better understood from reading the following description of non-limiting embodiments, with reference to the attached drawings, wherein below.

DETAILED DESCRIPTION

As discussed above, an in-vehicle computing system may enable a user to interact with one or more vehicle systems and/or external devices while in and/or operating a vehicle. Many of the functions performed by the in-vehicle computing system benefit from quick load times and low error rates. Some in-vehicle computing systems may be factory-loaded with original operating system software that may suffer from or acquire reliability and quality issues. Neither of these issues are acceptable in an automotive environment. In order to respond to unreliable and/or outdated operating system software without degrading a user experience, an original operating system of the in-vehicle computing system may be replaced with a new operating system that achieves faster loading, restart, and/or rebooting times, increased reliability, and/or additional features relative to the original operating system.

Figure 1:
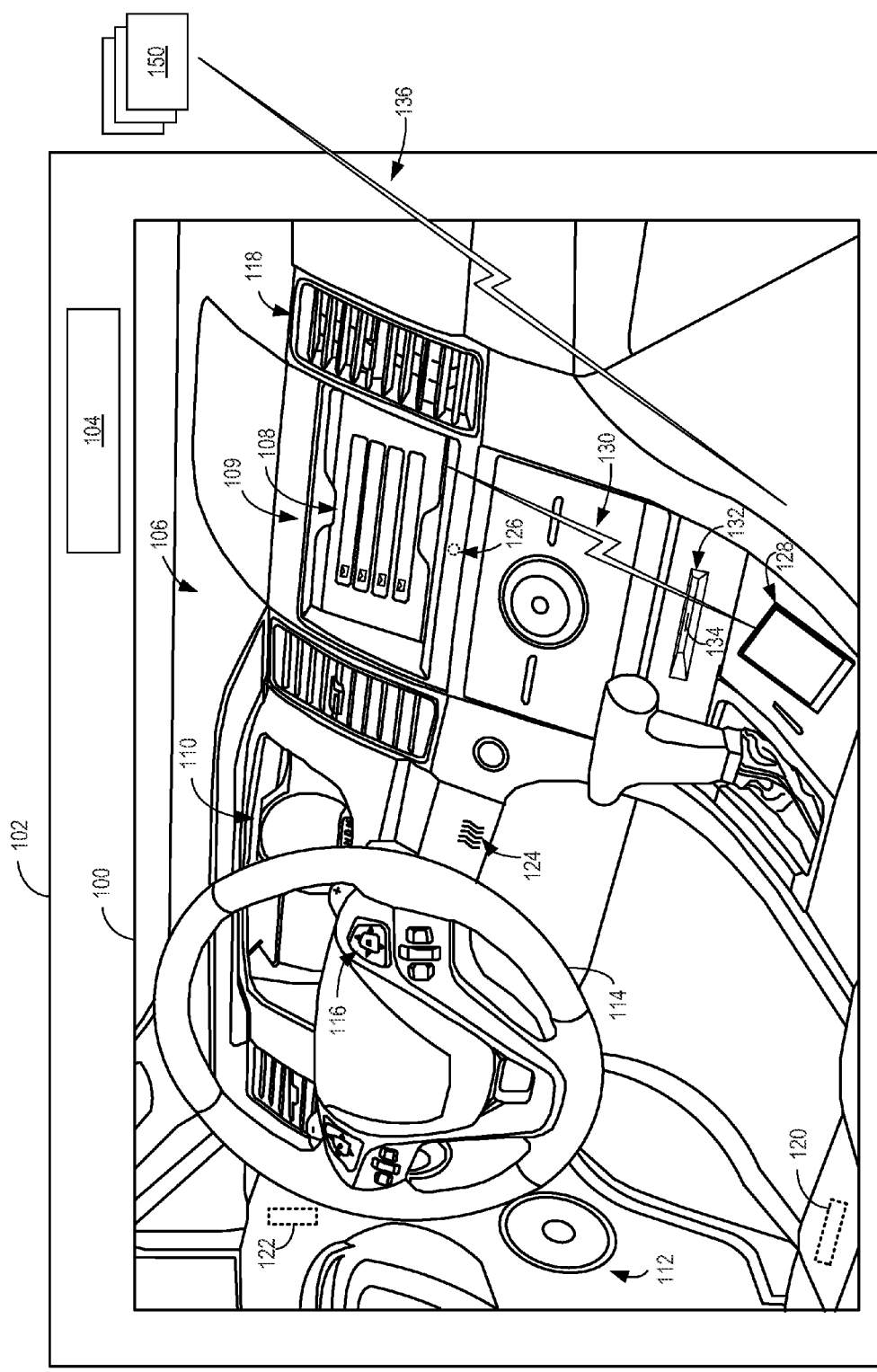
FIG. 1 shows an example partial view of an interior of a cabin of a vehicle in accordance with one or more embodiments of the present disclosure.

FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
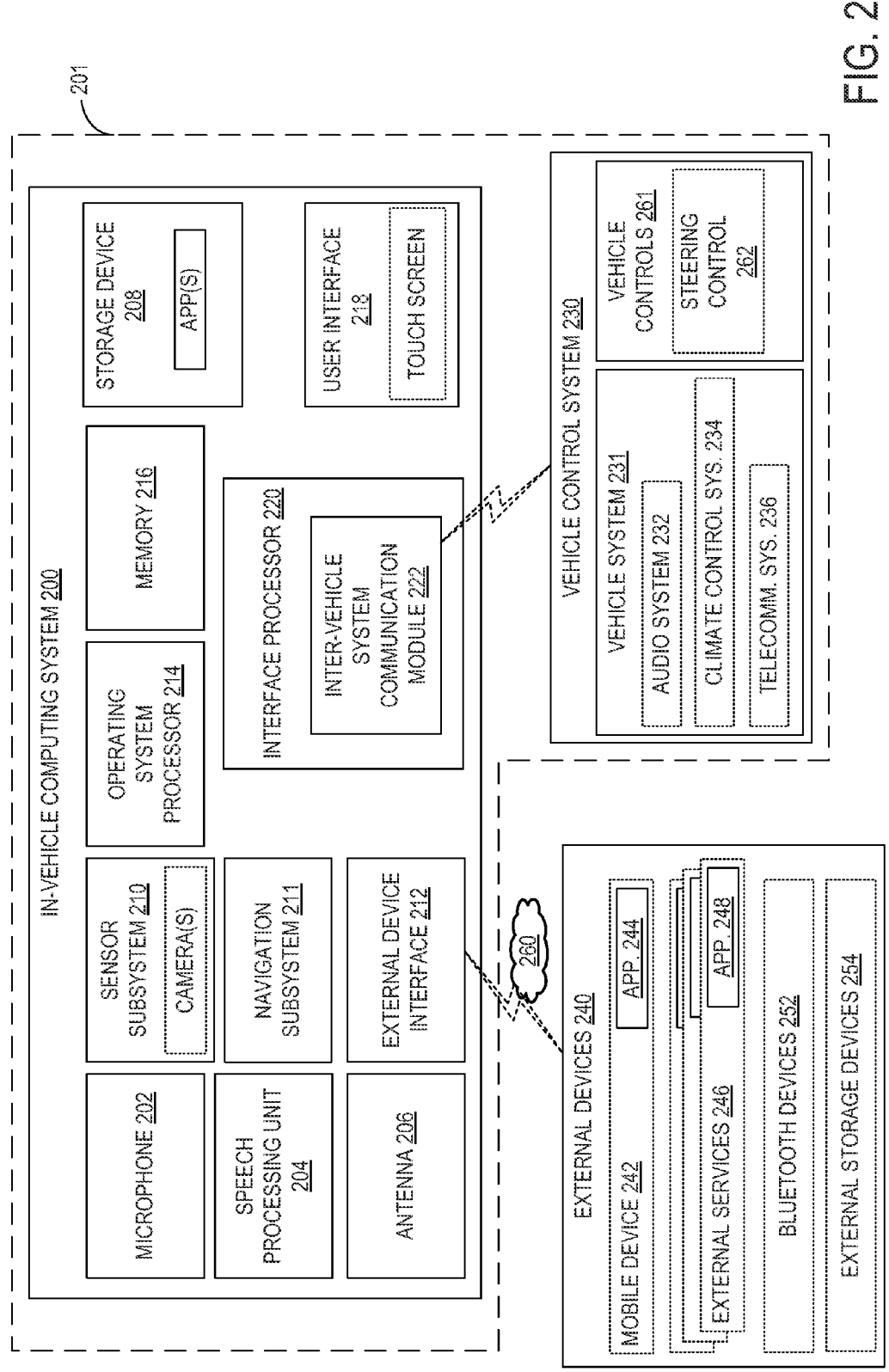
FIG. 2 shows a block diagram of an in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222. Processors 214 and 220 may each be associated with one or more watchdogs or watchdog timers. The watchdogs may monitor operation of various systems and initiate a reboot of the in-vehicle computing device when problematic operation is detected. In some embodiments, the watchdogs may include a watchdog timer that initiates the reboot of the in-vehicle computing device. Processors 214 and 220 may be configured to reset and/or restart the watchdog timers in accordance with a clock signal that ensures resetting and/or restarting of the watchdog timers prior to an expiration of the watchdog timers.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

It is to be understood that the CAN bus may be used to detect car activity or inactivity. For example, the CAN bus may remain active for several minutes to keep the headlights available or to provide delayed lights on select features. The modules may communicate on the CAN bus during user activities such that detection of car activity may be determined though activity on the CAN bus, such as through parameters on the CAN bus sensed from other vehicle systems.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, road construction/detour information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device (e.g., a caller's mobile device) and/or analyzed by the application to determine a driver status or determine whether a driver status has changed and perform an action based on the context (e.g., requesting/sending data to other devices).

The external services applications 248 may additionally or alternatively send requests to in-vehicle computing system 200 for data relating to the driver status responsive to a request received from a caller's mobile device. For example, a caller potentially attempting to contact a driver (e.g., a user of in-vehicle computing system 200 and/or mobile device 242) may send a request for a status of the driver prior to establishing a phone call. Responsive to such a request, external services applications 248 may process the request to determine a driver/device identifier and send a request to in-vehicle computing system 200 for a driver status. In some embodiments, a request for a driver status may be sent to the external services application 248 and/or to the in-vehicle computing system 200 via the driver's mobile device 242.

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface

218. Notifications and other messages (e.g., received messages), as well as navigational assistance, may be displayed to the user on a display of the user interface. User preferences/information and/or responses to presented messages may be performed via user input to the user interface.

Figure 3A:
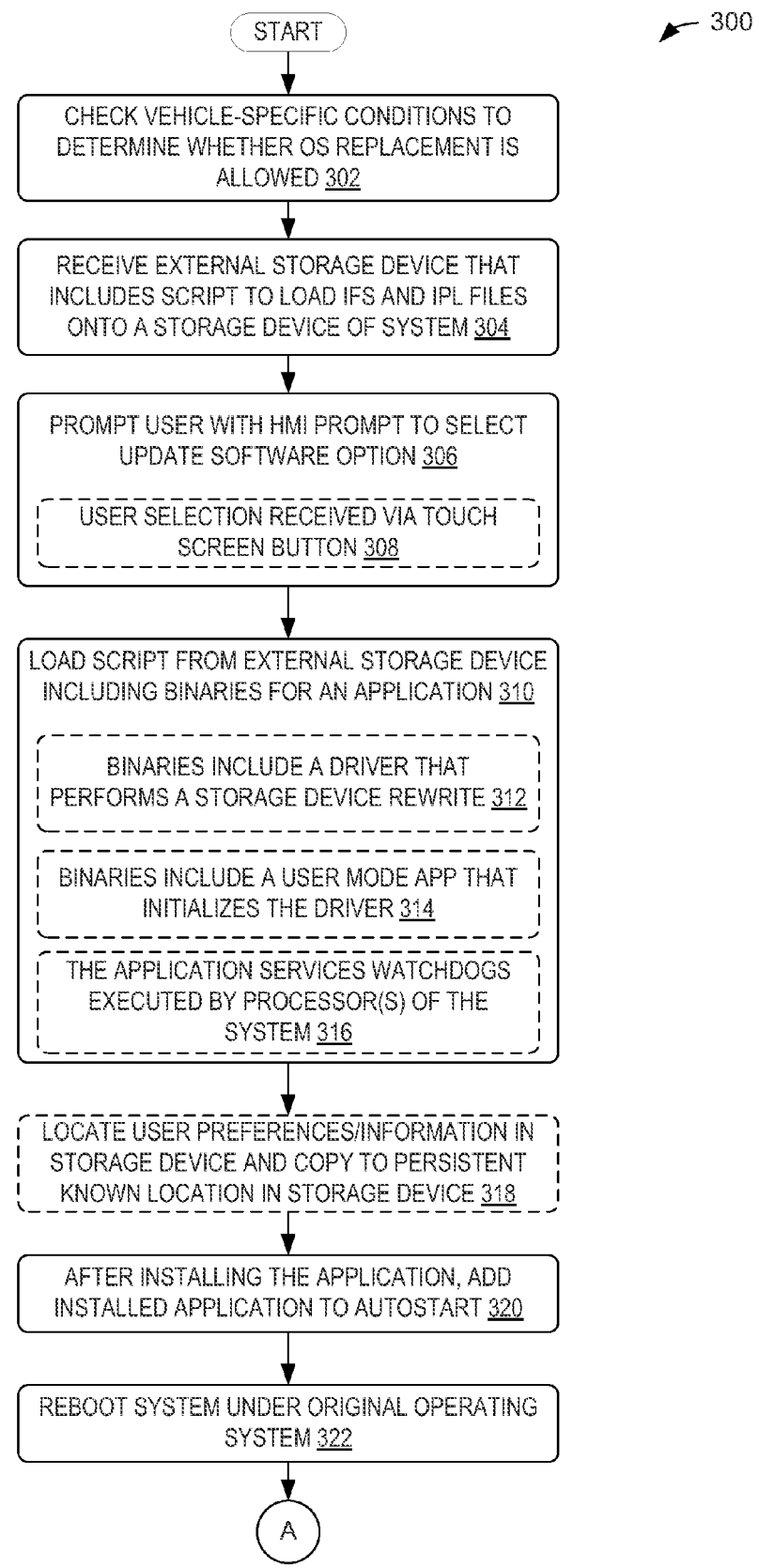
FIGS. 3A and 3B are flow charts for a method of replacing an original operating system of an in-vehicle computing system with a new operating system in accordance with one or more embodiments of the present disclosure.

FIG. 3A is a flow chart of a method for replacing an original operating system of an in-vehicle computing system, such as in-vehicle computing system 200 of FIG. 2, with a new operating system. Method 300 includes checking vehicle-specific conditions to determine whether operating system replacement is allowed, as indicated at 302. Examples of vehicle-specific conditions determining the allowance of operating system replacement are described in more detail below with respect to FIG. 4. For example, a security code may be entered to allow replacement, the security code being an algorithmic product of an embedded serial number or other suitable encrypted code in some examples. While operating under an original operating system, the method 300 may include receiving an external storage device that includes script (e.g., script that is configured for the currently installed operating system and/or comprises instructions in the language supported by the currently installed operating system) to load an image file system (IFS) and initial program loader (IPL) files onto a storage device of the system, as indicated at 304. For example, the IFS and IPL files may be stored in a flash memory storage device of the original operating system that provides non-volatile data storage. The external storage device may be received at an external storage device interface of the in-vehicle computing system, such as external device interface 212 of FIG. 2. The external storage device may include any suitable external storage device, such as a USB flash memory drive, an external hard drive disk storage device, an internal storage device of a computing device (e.g., a smart phone, a laptop, etc.), and/or any other storage device external to the in-vehicle computing system. In some embodiments, receiving an external storage device at an external storage device interface may include accessing an external storage device via a wired or wireless connection and/or through communication over a network. For example, the script to load IFS and IPL files may be stored in an external storage device communicatively connected to the in-vehicle computing system via a network.

The IFS and IPL files may include elements to enable installation of a new operating system onto the in-vehicle computing system to replace the original operating system. For example, storage of the IPL files at a master boot record and/or sector of the non-volatile storage device of the in-vehicle computing system may enable the system to operating using the new operating system. The IFS and IPL files may include a temporary update including a new in-vehicle operating system for storage in a memory location of the original in-vehicle operating system.

The method 300 may include prompting a user with a human-machine interface (e.g., a graphical user interface) prompt to select an update software option (e.g., prior to storing the IFS and IPL files) at 306. For example, the human-machine interface may include a touch screen, and the user selection may be received via actuation of a touch screen button, as indicated at 308. In some embodiments, the touch screen button may include a virtual button displayed on the touch screen that enables a user to begin installing the new operating system.

The method 300 includes loading script from the external storage device including binaries for installing an application at 310. For example, the script may be loaded automatically upon receiving the external storage device and/or after receiving a request to update the original in-vehicle operating system based on the temporary update. Loading the script from the external storage device may include temporarily storing one or more files in a storage device and/or memory of the in-vehicle computing system and executing one or more of the stored files via a processor of the in-vehicle computing system. As indicated at 312, the binaries may include a driver that performs an internal storage device write (e.g., in a memory location that was void of information) or rewrite (which may include a clear followed by the rewrite or a direct rewrite in some embodiments). For example, the driver may store files including the IFS and the IPL to the non-volatile storage device of the in-vehicle computing system (e.g., a non-volatile memory storage device). The information used to perform the operating system installation (e.g., the temporary update, the internal memory rewrite driver, the IFS/IPL files, etc.) may be received from an external storage device. In some embodiments, the information may only be received during selected vehicle conditions (e.g., while the vehicle is powered on) and/or responsive to a driver identification. As indicated at 314, the binaries may include a user mode application that initializes the driver (e.g., the driver that performs the internal storage device rewrite). The application may service one or more watchdogs executed by the processor and/or processors of the in-vehicle communication system, as indicated at 316. Examples of servicing the watchdogs are described in more detail with respect to FIG. 5. The user mode driver initialization application may be loaded (e.g., loading of the application may be triggered) responsive to receiving a request to update the operating system based on the temporary update. Once the updated has been initiated, the system may ensure that power is not disrupted in order to prevent corruption of the installation.

The method 300 may include locating user preferences, information, settings, and/or other user-specific and user-selected elements stored in the storage device (for example tuner presets, previous BLUETOOTH device pairing information, music preferences, etc.) of the in-vehicle computing system and copying the data corresponding to such elements to a persistent known location in the storage device for later retrieval, as indicated at 318. After installing the application, the method includes adding the installed application to an auto-start list at 320. For example, the auto-start list may include one or more applications to be automatically loaded, executed, and ran responsive to starting the in-vehicle computing system under the original operating system.

Figure 3B:
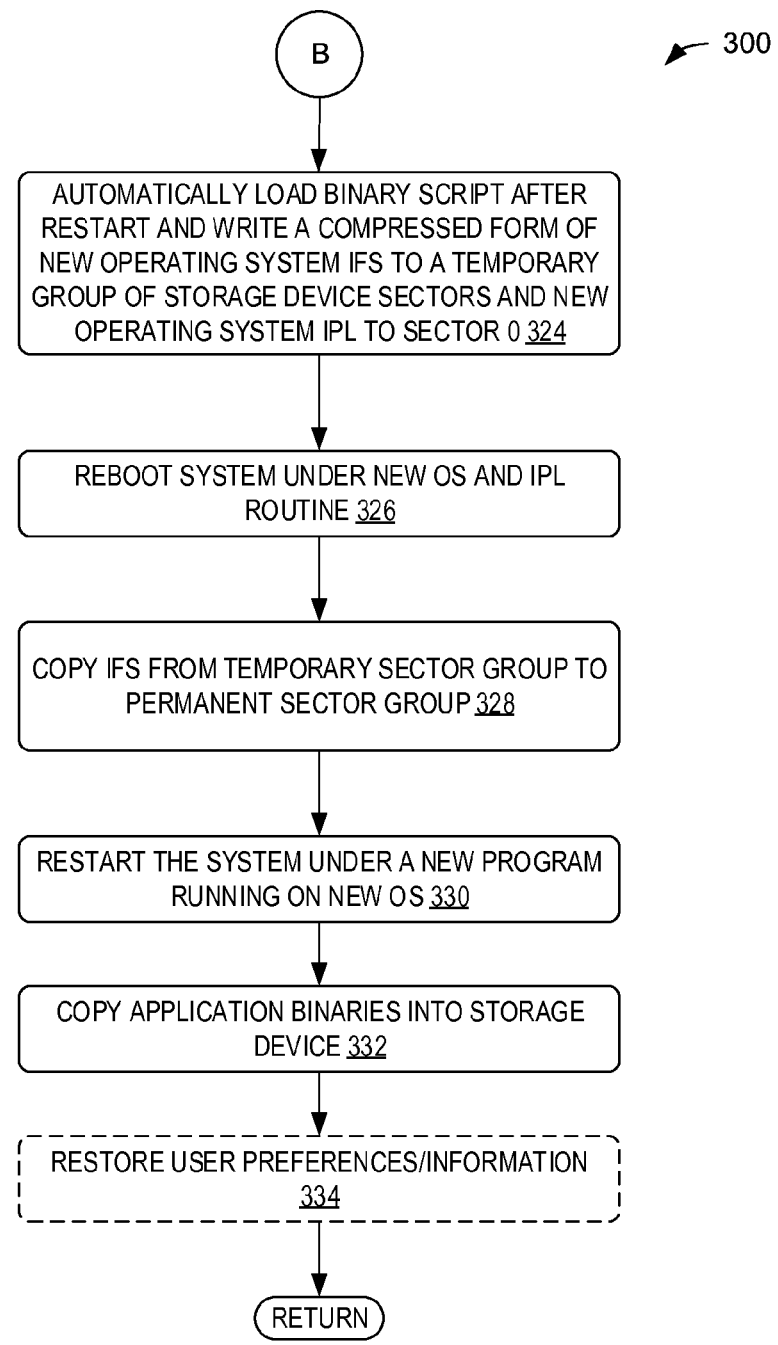

The method 300 includes rebooting the system while under the original operating system, as indicated at 322. For example, rebooting the system may include shutting down the in-vehicle computing system and restarting the system. The method 300 proceeds to 324 in FIG. 3B to include automatically loading the binary script after the restart and writing a compressed form of the IFS of the new operating system to a temporary group of storage device sectors and the IPL of the new operating system to a master boot sector of the storage device, such as sector 0. The temporary group of storage device sectors may include one or more sectors of the storage device that are accessible for temporarily storing the IFS for the new operating system. The temporary group of storage device sectors may be known and/or otherwise identifiable by the IPL for subsequent access. As the master boot sector determines the boot loading sequence for the in-vehicle computing system, rebooting the system at 326 includes rebooting the system under the new operating system and IPL routine. For example, a restart may initialize the in-vehicle computing device in accordance with information stored at the processor-defined start up memory location (referred to as sector 0). After writing the IPL to sector 0 of the storage device of the in-vehicle computing system, the reboot performed at 326 enables the new operating system and IPL to run when the in-vehicle computing system is restarted as a part of the reboot process.

The method 300 includes copying the IFS from the temporary sector group of the storage device of the in-vehicle computing system to a permanent sector group of the storage device while operating under the new operating system at 328. The permanent sector group may be selected to store the IFS for a longer period of time and/or persist after a larger number of reboot cycles in comparison to the temporary sector group. The system may be restarted at 330 under a new program running on the new operating system, which enables the application binaries to be copied into the storage device at 332 for persistent storage. The method 300 may include restoring user preferences/information/settings, etc., at 334. For example, the user-specified elements stored at the known persistent location may be retrieved at 334 and rewritten to a location known by the applications that access said elements in order to enable the user to immediately resume familiar operation of the in-vehicle computing system.

Figure 4:
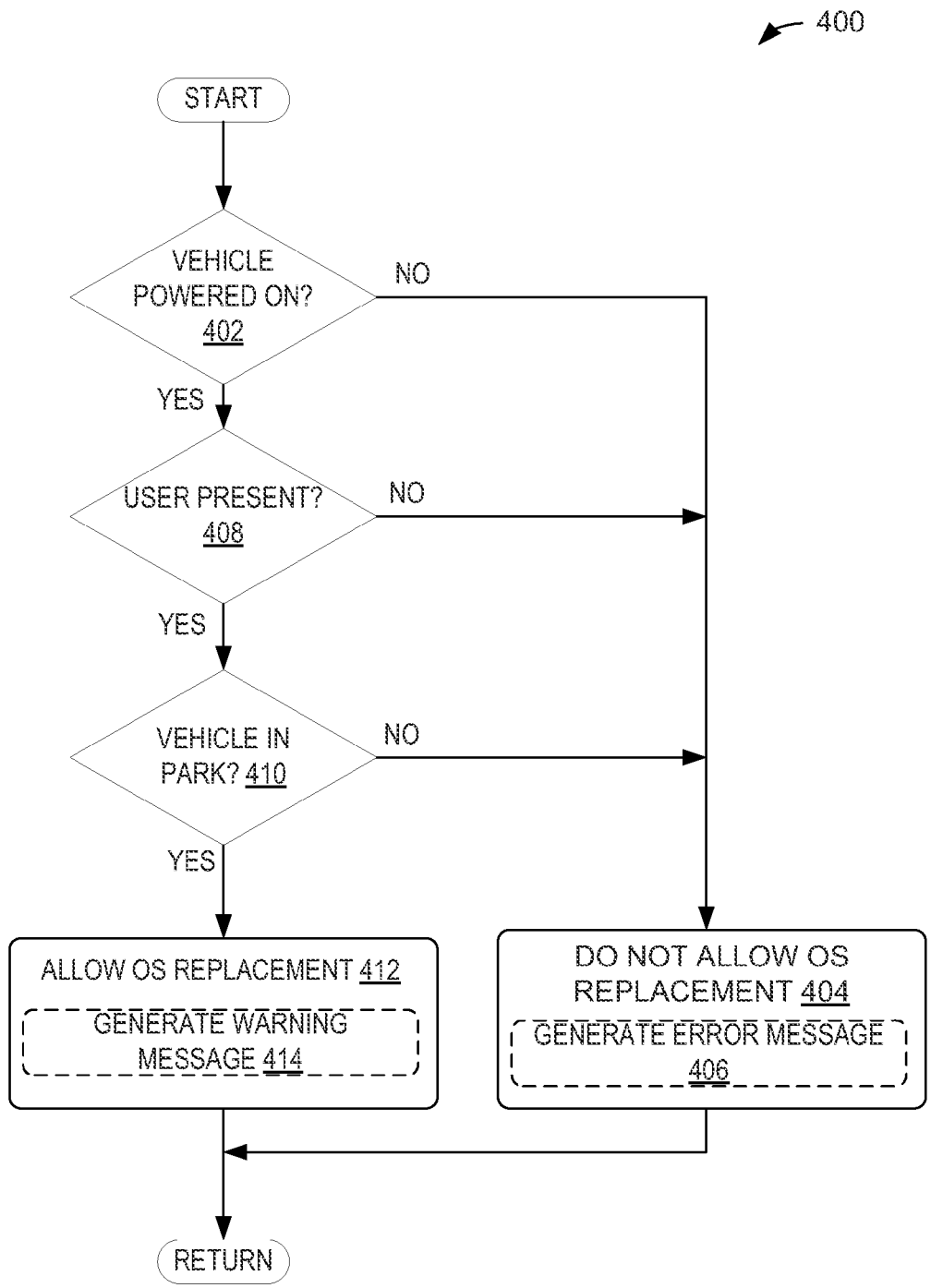
FIG. 4 is a flow chart for a method of checking vehicle-specific conditions to determine whether operating system replacement is allowed in accordance with one or more embodiments of the present disclosure.

FIG. 4 shows a flow chart for one or more embodiments of a method 400 of checking vehicle-specific conditions to determine whether operating system replacement is allowed. For example, one or more steps of FIG. 4 may be performed to identify or otherwise indicate whether the original operating system of an in-vehicle computing system may be replaced with a new operating system. The method 400 includes determining whether the vehicle is powered on at 402. For example, the in-vehicle computing system may communicate via the controller area network (CAN) bus of the vehicle to determine power states, ignition states, and/or any other suitable state of the vehicle that indicates whether the vehicle is powered on. If the vehicle is powered off or otherwise not determined to be powered on, the method 400 proceeds to 404, where the in-vehicle computing system does not allow the operating system to be replaced. In some embodiments, the method 400 may include generating and/or displaying an error message to indicate that the operating system may not be replaced, as indicated at 406. The error message may detail the reason for not allowing the replacement in some embodiments, while in other embodiments, the error message may be generic to any operating system replacement blocking condition. For example, if the operating system replacement is not allowed because the vehicle is not determined to be in a parking state (e.g., at step 410), the error message may instruct a user to place the vehicle in park in order to perform the operating system replacement routine. The routine may be resumed immediately upon correcting the issue causing the error message and/or resumed after reinitializing the replacement routine.

If the vehicle is determined to be powered on at 402, the method 400 proceeds to 408 to determine whether a user is present. For example, one or more sensors of the in-vehicle computing system (e.g., microphone, camera, etc.) and/or the vehicle (e.g., seat occupancy sensor, humidity sensor, door sensor, etc.) may be accessed to determine whether the user is present. If a user is determined to be absent, the method 400 proceeds to 404 to not allow operating system replacement. Alternatively, if a user is determined to be present, the method 400 proceeds to 410 to determine whether the vehicle is in a parked state. For example, if the vehicle includes an automatic transmission, the vehicle may be determined to be in a parked state if the parking gear is engaged and/or a parking brake is engaged. Manual transmission vehicles may be determined to be in a parked state if the vehicle is in a first or neutral gear and a brake pedal is depressed and/or if a parking brake is engaged. In some embodiments, the parked state may be determined by detecting wheel pulses (e.g., of wheels of the vehicle interfacing with the ground over which the vehicle travels) and/or a transmission state via a vehicle controllable area network (CAN) bus. If the vehicle is not determined to be in a parked state, the method proceeds to 404 to not allow operating system replacement. For example, during the operating system replacement routine, the operating system processor may control the display of the in-vehicle computing system. Accordingly, during reboot cycles of the in-vehicle computing system, the user may not be able to view output from a rear-view camera for assisting the user in parking the vehicle. Accordingly, placing the vehicle in a parking state ensures that the vehicle is not operated with unavailable features that can improve driver feedback, such as a back-up camera, proximity sensor indicators, etc. Conversely, if the vehicle is determined to be in a parked state, the method 400 proceeds to 412 to allow the operating system replacement to be performed. For example, method 400 of FIG. 4 may be performed responsive to detecting and/or receiving the external storage device at step 304 of method 300, as shown in FIG. 3A.

Upon allowing the operating system replacement to be performed, method 300 may commence with step 304 and/or 306 of FIG. 3A. As indicated at 414, a warning message may be generated upon allowing the operating system replacement to commence and/or upon starting the operating system replacement routine. The warning message may instruct a user to refrain from changing an operating state of the vehicle (e.g., turning off the vehicle, shifting a gear of the vehicle, releasing a parking brake, etc.) and/or changing an operating state of the in-vehicle computing system (e.g., turning off the in-vehicle computing system, making a selection via a human-machine interface of the system, connecting/disconnecting an external device, etc.). If the operating system replacement is not allowed to be performed, method 300 may terminate before performing step 304 and/or 306.

Figure 5:
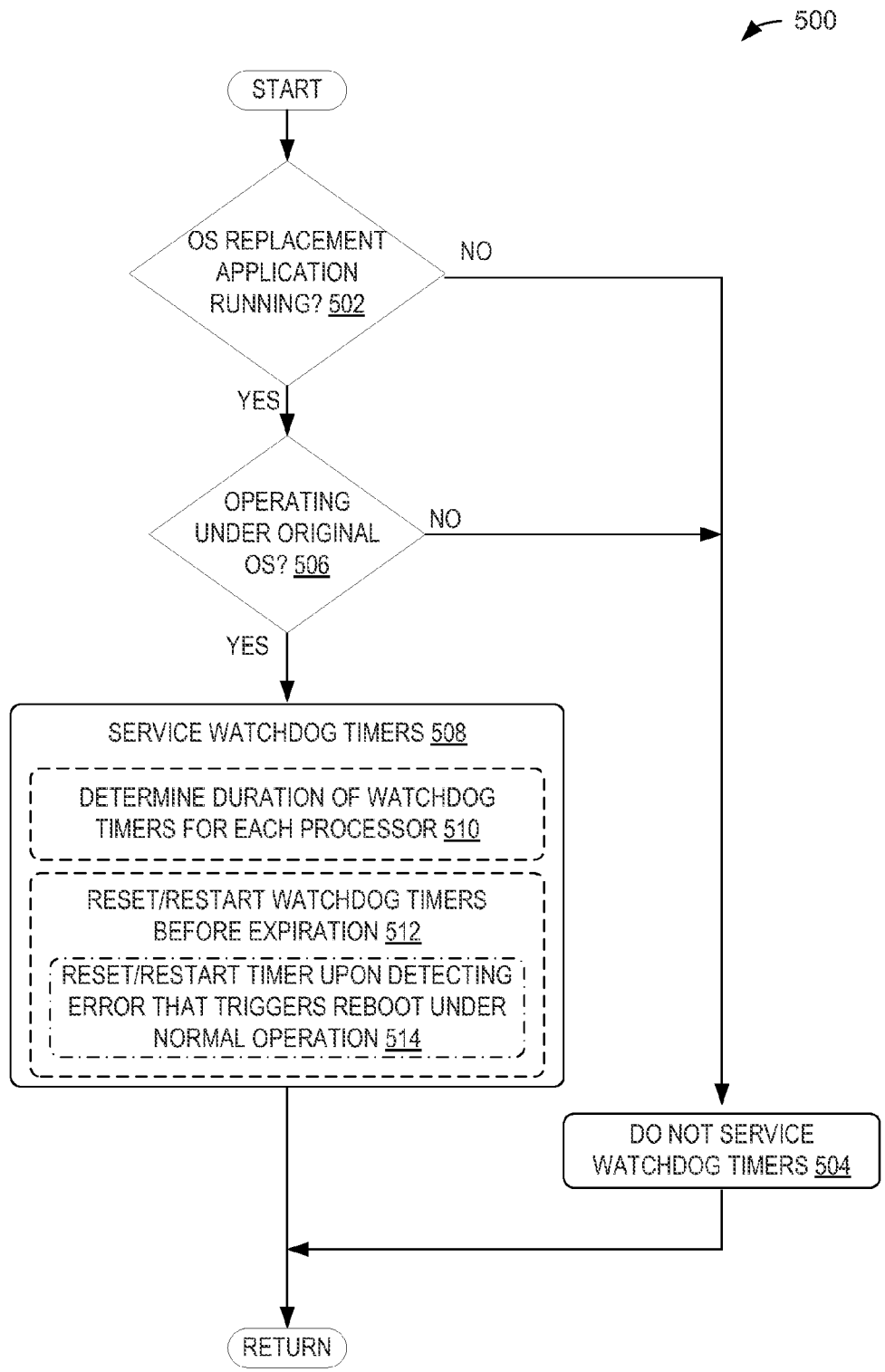
FIG. 5 is a flow chart for a method of servicing watchdog timers in a processor of an in-vehicle computing system in accordance with one or more embodiments of the present disclosure.

FIG. 5 is a flow chart for a method 500 of servicing one or more watchdog timers for processors of an in-vehicle computing system. As discussed above with respect to FIG. 2, an in-vehicle computing system may include a first processor for controlling an operating system of the in-vehicle computing system and related applications (e.g., a human-machine interface of the in-vehicle computing system). The in-vehicle computing system may also include a second processor for controlling operations relating to power distribution amongst vehicle systems, inter-vehicle communications, a controllable area network (CAN) bus or other vehicle bus (e.g., Media Oriented Systems Transport bus or audio/video bridging Ethernet) for the vehicle, and/or any other vehicle system-related operations. Each processor of the in-vehicle computing system may be responsible for periodically resetting and/or restarting a watchdog timer that restarts the in-vehicle computing system upon expiration. An error in the system may prevent the processors from resetting and/or restarting a particular watchdog timer associated with the error or system on which the error originated. Accordingly, such errors may cause the in-vehicle computing system to automatically restart once the watchdog timer expires.

The application loaded during installation of the new operating system may be responsible for ensuring that the watchdog timers continue being reset/restarted while the new operating system is installed, even during events that normally trigger a system restart and/or prevent a timer reset/restart. At 502, the method 500 includes determining whether an operating system replacement application is running. As described above, the watchdogs are serviced by the application, so the watchdogs may only be serviced when the application is running Watchdog timers may be used to make the operating system replacement robust. If the operating system replacement application is determined to not be running at 502, the method 500 proceeds to 504, where the watchdog timers are not serviced. If the operating system replacement application is determined to be running at 502, the method 500 proceeds to 506 to determine whether the in-vehicle computing system is operating under the original operating system. If the system is not operating under the original operating system, the watchdog timers may safely continue operation, so the method 500 proceeds to 504 to not service the watchdog timers. Conversely, if the computing system is determined to be operating under the original operating system at 506, the method 500 proceeds to 508 to service the watchdog timers.

As indicated at 510, servicing the watchdog timers may include determining the duration of the watchdog timers associated with each processor of the system. Servicing the watchdog timers (e.g., in response to receiving or running the user mode driver initialization application) may include resetting and/or restarting the watchdog timers before each timer expires, as indicated at 512. For example, one or more clocks having a duration that is less than the duration of the watchdog timers may control a reset/restart signal sent to the timers to ensure that each watchdog timer is reset and/or restarted before the timer expires. As indicated at 514, the timer may be reset and/or restarted upon detecting an error that triggers a system reboot under normal operation (e.g., while operating under the original operating system). The watchdog timers may continue to be serviced as long as the operating system replacement application is running and the in-vehicle computing system is operating under the original operating system. Upon a change of state of either of the above-identified conditions, the watchdog timer servicing may be terminated. For example, watchdog timer servicing may be initiated responsive to receiving the external storage device at 304 of FIG. 3A and/or responsive to installing the application at 310 of FIG. 3A. The watchdog servicing may be terminated upon rebooting the system under the new operating system at 326 of FIG. 3B and/or responsive to terminating the application. As the watchdogs are serviced during installation of the new operating system, other vehicle systems, such as the CAN bus, air conditioning systems, sensor systems, engine systems, and the like may continue to operate normally without interruption during the entire operating system replacement (e.g., during all steps of method 300 of FIGS. 3A and 3B). In some embodiments, the operating system processor may control one or more systems related to vehicle operation and/or user interfaces for vehicle system operation. Accordingly, in some embodiments, one or more systems may be unavailable and/or intermittently available as the in-vehicle computing system is rebooted.

The in-vehicle computing system original operating system may be replaced with a light-weight operating system that is specialized for an embedded computing system in a vehicle environment. In some embodiments, the in-vehicle computing system original operating system may be replaced with a new operating system that loads in a significantly shorter period of time than the original operating system. For example, an original operating system may load from a cold reboot in 30 seconds or longer, while a new operating system may load from a cold reboot is significantly shorter depending on the speed of the processor.

Figure 6:
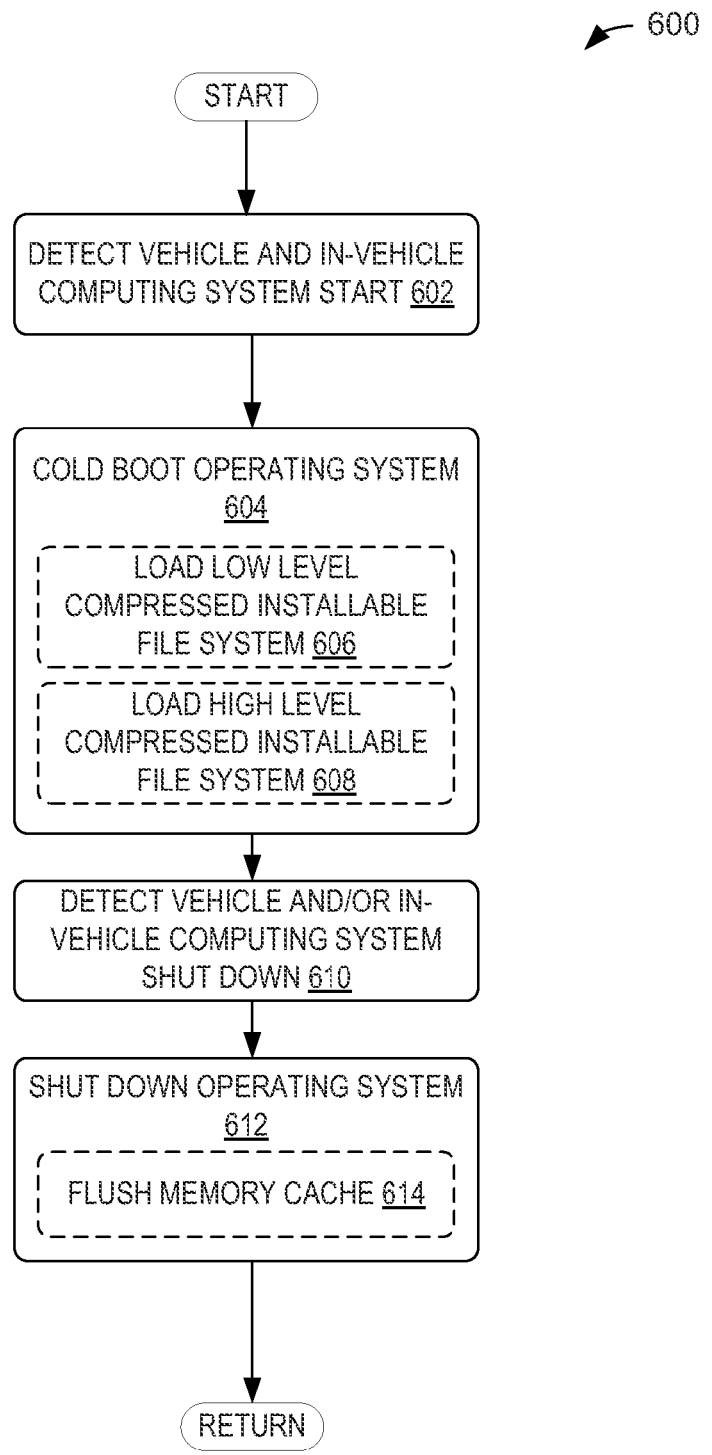
FIG. 6 is a flow chart for a method of booting an operating system for an in-vehicle computing system in accordance with one or more embodiments of the present disclosure.

FIG. 6 is a flow chart of an example boot up routine 600 for a new operating system, such as an operating system to replace an original operating system in an in-vehicle computing device. The routine 600 includes detecting a vehicle and in-vehicle computing system starting condition at 602. For example, upon starting the in-vehicle computing system, a signal may be sent to a processor of the system. As indicated at 604, the routine 600 includes starting the operating system from a cold boot. The load time of the cold boot may be decreased in comparison with other operating systems, as the cold boot may include loading a low level compressed IFS at 606 before loading a high level compressed IFS at 608. For example, the low level IFS may enable low level components such as a board support package that enables software drivers that are likely to be depended upon to enable high level operations to be performed (e.g. drivers for components that perform voice recognition). The high level IFS may enable high level components such as application software to be loaded (e.g., human-machine interface software, a voice recognition application, etc.). The IFS may be broken up into sub-elements to load particular features that are likely to be used at vehicle startup before loading less urgent elements. For example, components for displaying a startup logo and a rear view camera may be loaded first, as a driver may be likely to reverse (e.g., out of a parking area) within a few seconds of starting the vehicle. The IFS may be compressed to increase speed of retrieval and provide efficient storage. In examples where files are compressed, moving a file from a first sector of memory storage to a second sector of memory storage may include decompressing the IPL/IFS files and copying the IFS/IPL files from the first sector to a second sector.

At 610, the routine 600 includes detecting a vehicle and/or in-vehicle computing system shut down. For example, the vehicle may be determined to be shut down based on an ignition state, a user absence, a loss of power, and/or any other suitable shut down condition. In response to the shut down condition, the routine 600 includes shutting down the operating system at 612. For example, shutting down the operating system may include flushing the memory cache, as indicated at 614, to ensure that any errors are cleared before the system is restarted from a cold boot at the next vehicle and in-vehicle computing system start.

Figure 7:
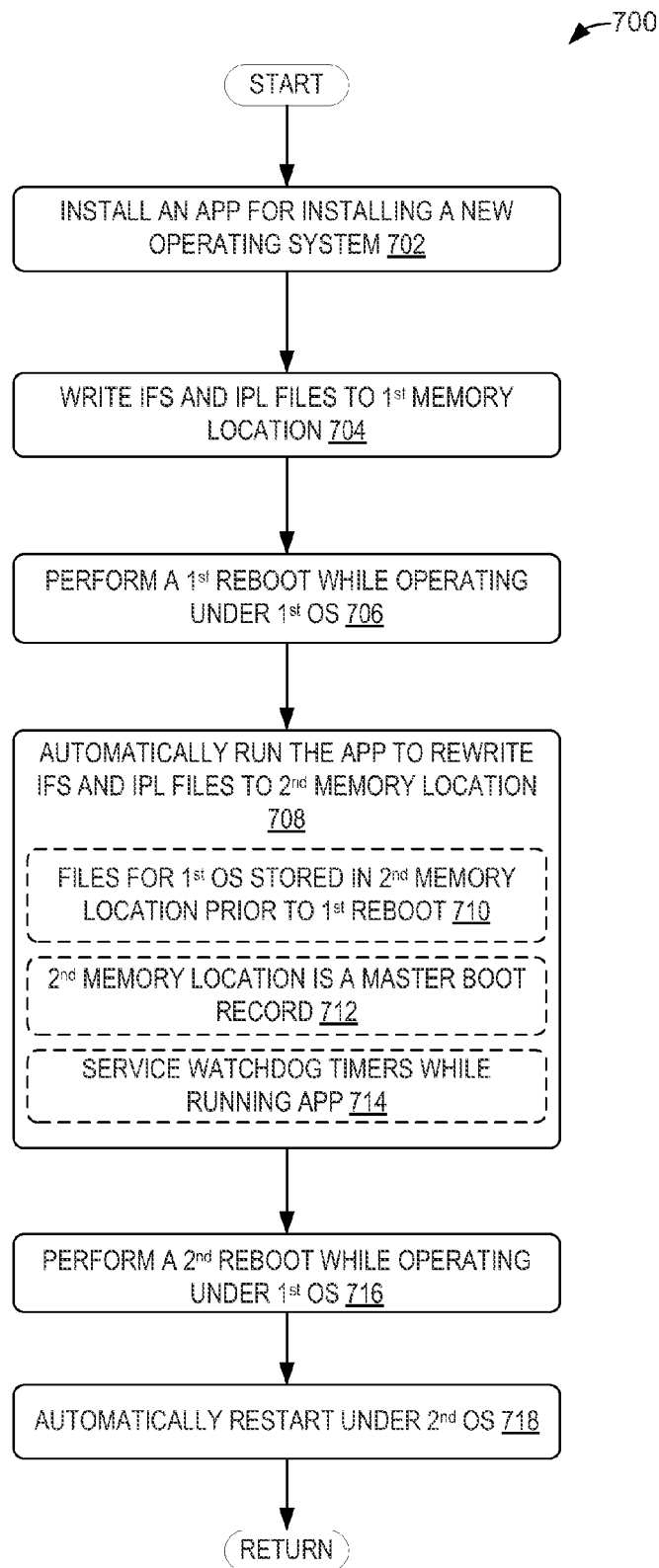
FIG. 7 is a flow chart of an example method of replacing an original operating system of an in-vehicle computing system with a new operating system in accordance with one or more embodiments of the present disclosure.

FIG. 7 is a flow chart of an example method 700 of replacing an original operating system with a new operating system in an in-vehicle computing system of a vehicle. For example, method 700 may be performed by/with an in-vehicle computing system, such as in-vehicle computing system 200 of FIG. 2. At 702, method 700 includes installing an application for installing the new operating system within a first/original operating system of the in-vehicle computing system. At 704, the method includes writing an image file system (IFS) and initial program loader (IPL) files to a first memory location (e.g., a first memory location in a local storage device of the in-vehicle computing system). At 706, the method includes performing a first reboot of the in-vehicle computing system while operating under the original operating system.

Upon rebooting, the method includes automatically running the application to rewrite the IFS and the IPL files from the first memory location to a second memory location, as indicated at 708. One or more files corresponding to the original operating system may be stored in the second memory location prior to the first reboot, as indicated at 710. For example, the second memory location may be a master boot record for a storage device of the in-vehicle computing system, as indicated at 712. In some examples, the method may include servicing one or more watchdog timers of the in-vehicle computing system while running the application, as indicated at 714. At 716, method 700 includes performing a second reboot of the in-vehicle computing system while operating under the original operating system. At 718, method 700 includes automatically restarting the in-vehicle computing system under the new operating system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system and/or vehicle control system described with reference to FIG. 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The invention claimed is:

1. A method to selectively replace a first in-vehicle operating system of an in-vehicle computing system of a vehicle, the method comprising:
receiving a temporary update including a second in-vehicle operating system for storage in a first memory location of a storage device of the first in-vehicle operating system;
receiving a script comprising instructions in a language supported by the first in-vehicle operating system to store an image file system (IFS) for the second in-vehicle operating system and initial program loader (IPL) files for the second in-vehicle operating system onto the storage device of the in-vehicle computing system, wherein one or more components of the IFS file is compressed using one or more compression levels;
receiving a request to update the first in-vehicle operating system based on the temporary update;
triggering a reboot of the first in-vehicle operating system responsive to receiving the request to update the first in-vehicle operating system; and
after performing the reboot of the first in-vehicle operating system, automatically loading the script and moving one or more files from the temporary update from the first memory location to a second memory location of the storage device, the second memory location being different from the first memory location and the second memory location being specified by a processor of the in-vehicle computing system to be a boot sector location from which the system reboots in order to run the second in-vehicle operating system, wherein loading of the IFS file is performed in order of the compression levels of the components of the IFS file.

2. The method of claim 1, further comprising automatically restarting under the second in-vehicle operating system following installing the second in-vehicle operating system responsive to a state of the vehicle.

3. The method of claim 1, wherein the boot sector location comprises a master boot record and/or sector, and wherein the script includes binaries for installing the second in-vehicle operating system, the binaries including a driver that performs an internal storage device write or rewrite to store the IFS and IPL files for the second in-vehicle operating system.

4. The method of claim 1, wherein receiving the request to update the first in-vehicle operating system based on the temporary update triggers loading an internal memory rewrite driver.

5. The method of claim 1, wherein receiving the request to update the first in-vehicle operating system based on the temporary update triggers loading a user mode driver initialization application for the second in-vehicle operating system where the user mode driver initialization application is added to an auto-start list for the first in-vehicle operating system.

6. The method of claim 5, further comprising resetting one or more watchdog timers in response to receiving or running the user mode driver initialization application prior to expiration of the one or more watchdog timers.

7. The method of claim 1, further comprising copying user preferences in the first in-vehicle operating system to a third memory location for use by the second in-vehicle operating system.

8. A method of replacing an original operating system with a new operating system for an in-vehicle computing system, the method comprising:
receiving an image file system (IFS) and initial program loader (IPL) files for the new operating system at an external storage device interface of the in-vehicle computing system during operation of the in-vehicle computing system under the original operating system, one or more files for the original operating system being stored at a boot sector location of the in-vehicle computing system, the boot sector location specifying a location from which the in-vehicle computing system reboots;
receiving a binary script comprising instructions in a language supported by the original operating system to store the IFS for the new operating system and the IPL files for the new operating system onto a storage device of the in-vehicle computing system, wherein one or more components of the IFS file is compressed using one or more compression levels;
storing the IFS and the IPL files in a first memory location of the in-vehicle computing system;

rebooting the in-vehicle computing system while operating under the original operating system, the rebooting including shutting down the in-vehicle computing system and restarting the in-vehicle computing system to the original operating system by accessing and reading from the boot sector location;

after rebooting the in-vehicle computing system, automatically loading the binary script and moving the IFS and the IPL files for the new operating system from the first memory location of the storage device to a second memory location of the storage device, the second memory location being different from the first memory location and comprising the boot sector location such that one or more of the IPL files for the new operating system replaces the one or more files for the original operating system stored at the boot sector location; and after moving the IFS and the IPL files for the new operating system, rebooting the in-vehicle computing system while operating under the original operating system, the rebooting including shutting down the in-vehicle computing system and automatically restarting the in-vehicle computing system under the new operating system by accessing and reading from the boot sector location, wherein loading of the IFS file is performed in order of the compression levels of the components of the IFS file.

9. The method of claim 8, further comprising, while operating under the original operating system, locating user preferences in the storage device of the in-vehicle computing system and copying the user preferences to a known memory location of the in-vehicle computing system.

10. The method of claim 9, further comprising, while operating under the new operating system, restoring the user preferences stored in the known memory location of the in-vehicle computing system.

11. The method of claim 8, wherein storing the IFS and the IPL files in the first memory location of the in-vehicle computing system includes loading a script from an external storage device including binaries for an application.

12. The method of claim 11, wherein the binaries include a driver that performs an internal memory rewrite to store the IFS and the IPL files in the first memory location, and wherein the IFS is divided into a low level compressed IFS and a high level compressed IFS, the low level compressed IFS being loaded before the high level compressed IFS.

13. The method of claim 12, wherein the binaries include a user mode application that initializes the driver.

14. The method of claim 13, wherein the user mode application is added to an auto-start list for the original operating system, the auto-start list including applications that are run automatically responsive to starting the original operating system.

15. The method of claim 14, wherein the user mode application is configured to service one or more watchdog timers of the in-vehicle computing system by resetting the one or more watchdog timers before the one or more watchdog timers expire, the watchdog timers being serviced while the original operating system is replaced with the new operating system.

16. The method of claim 8, wherein moving the IFS and the IPL files from the first memory location to the second memory location includes writing a compressed form of the IFS and IPL files to the second memory location comprising the boot sector location, wherein the boot sector location comprises a master boot record and/or sector, and wherein the master boot record and/or sector determines a boot loading sequence for the in-vehicle computing system.

17. The method of claim 16, further comprising decompressing the IPL files and copying the IFS from a first sector to a second sector.

18. The method of claim 17, further comprising restarting the in-vehicle computing system while operating under the new operating system and copying application binaries into the storage device of the in-vehicle computing system.

19. An in-vehicle computing system comprising:
an audio device interface for communicating with one or more audio devices of a vehicle;
a storage device;
an external device interface;
a memory device configured to store instructions; and
a processor configured to execute the instructions to:
receive an image file system (IFS) and initial program loader (IPL) files at the external device interface during operation of the in-vehicle computing system under an original operating system;
install an application for installing a new operating system within the original operating system, the application comprising a binary script including instructions in a language supported by the original operating system to store the IFS and the IPL files for the new operating system onto the storage device of the in-vehicle computing system, wherein one or more components of the IFS file is compressed using one or more compression levels;
determine whether an operating system replacement is allowed based on one or more of a state of the vehicle and a presence of a user in the vehicle;
responsive to determining that the operating system replacement is allowed, reboot the in-vehicle computing system to the original operating system while operating under the original operating system;
after rebooting the in-vehicle computing system, run the application to rewrite the IFS and the IPL files from a first memory location to a second memory location, the first memory location being different from the second memory location, and the second memory location being specified by the processor as a location from which the in-vehicle computing system reboots; and
after rewriting the IFS and the IPL files, reboot the in-vehicle computing system to the new operating system while operating under the original operating system, rebooting the in-vehicle computing system to the new operating system including automatically restarting the in-vehicle computing system under the new operating system, wherein loading of the IFS file is performed in order of the compression levels of the components of the IFS file.

20. The in-vehicle computing system of claim 19, wherein the processor includes a first processor for controlling operation of an operating system and a human-machine interface of the in-vehicle computing system and a second processor for controlling power to the in-vehicle computing system and communication between the in-vehicle computing system and other elements of the vehicle, and wherein the second memory location comprises a boot sector location including a master boot record and/or sector.

* * * * *